(No Model.) 2 Sheets—Sheet 1.

E. CLIFF.
VEHICLE SPRING.

No. 429,842. Patented June 10, 1890.

WITNESSES:
A. F. Walz,
Mark W. Dewey

INVENTOR
Edward Cliff
BY
Duell, Laass & Duell
ATTORNEYS (No Model.) 2 Sheets—Sheet 2.

E. CLIFF.
VEHICLE SPRING.

No. 429,842. Patented June 10, 1890.

WITNESSES:
A. F. Walz,
Mark W. Dewey.

INVENTOR:
Edward Cliff
BY
Dull, Laass & Dull
ATTORNEYS

UNITED STATES PATENT OFFICE.

EDWARD CLIFF, OF NYACK, NEW YORK.

VEHICLE-SPRING.

SPECIFICATION forming part of Letters Patent No. 429,842, dated June 10, 1890.

Application filed July 15, 1889. Serial No. 317,550. (No model.)

*To all whom it may concern:*

Be it known that I, EDWARD CLIFF, of Nyack, in the county of Rockland, in the State of New York, have invented new and useful Improvements in Vehicle-Springs, of which the following, taken in connection with the accompanying drawings, is a full, clear, and exact description.

This invention relates to the class of vehicle-springs in which torsion-bars attached to the body of the vehicle are provided with cranks or arms, by which they are connected to the ends of a spring mounted on the axle or head-block.

My present invention consists in an improved construction and combination of parts, as hereinafter fully described, and specifically set forth in the claims.

Figure 1:
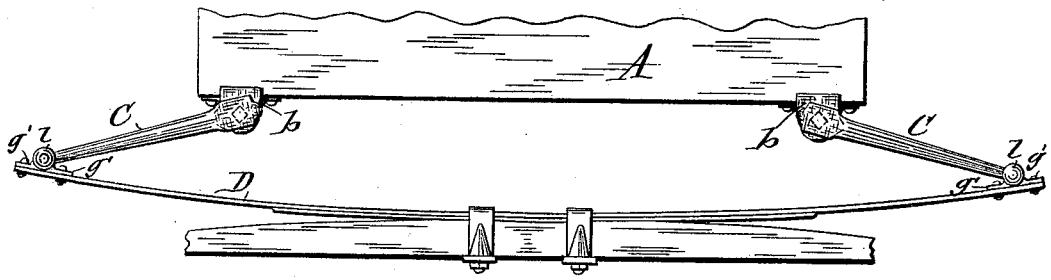
Figure 2:
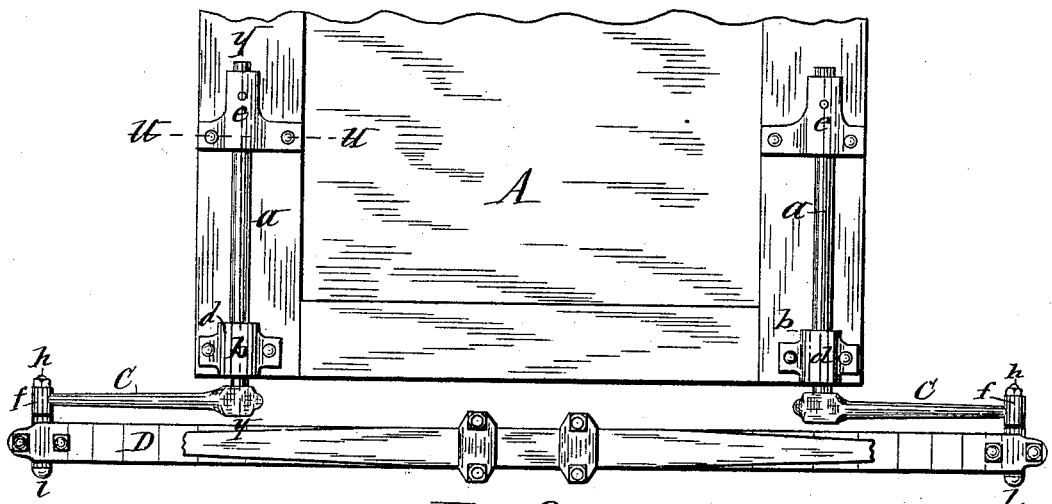
Figure 3:
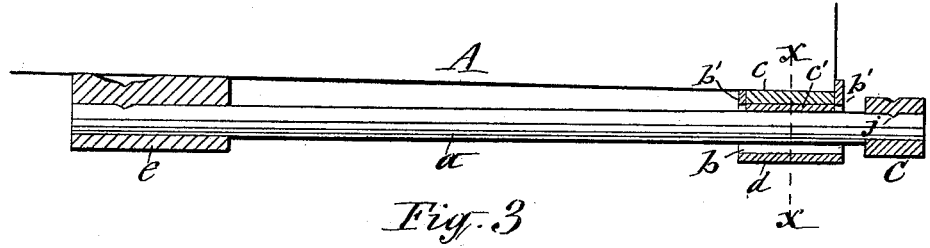
Figure 4:
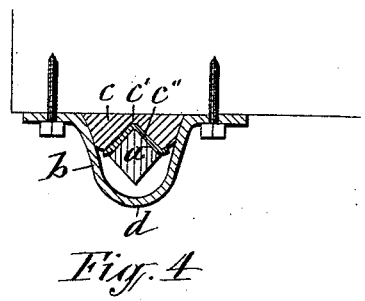
Figure 6:
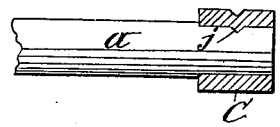
Figure 5:
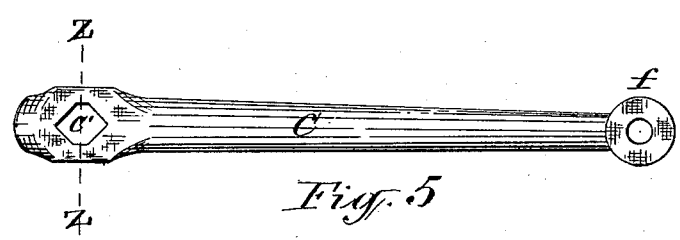
Figure 7:
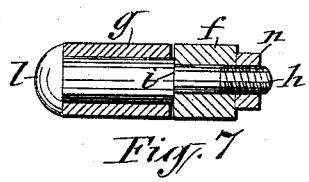
Figure 8:
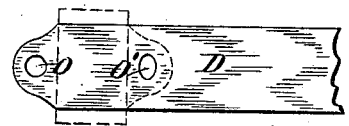
Figure 9:
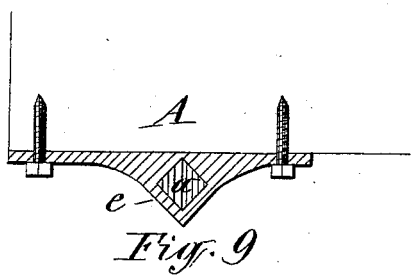
Figure 10:
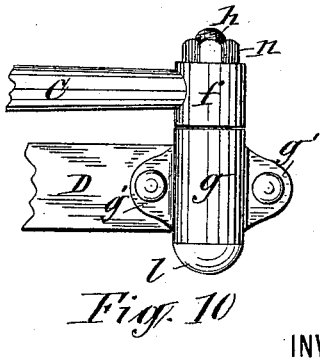

In the annexed drawings, Figure 1 is an end elevation of that portion of a vehicle to which my improved spring is connected. Fig. 2 is an inverted plan view of the same. Fig. 3 is an enlarged longitudinal section on line $y$ $y$, Fig. 2. Fig. 4 is an enlarged transverse section on line $x$ $x$, Fig. 3. Fig. 5 is a detached side view of the arm by which the torsion-bar is connected to the semi-elliptic spring or analogous cross-spring. Fig. 6 is a sectional view on line $z$ $z$, Fig. 5, showing the connection of the aforesaid arm with the torsion-bar. Fig. 7 is a longitudinal sectional view of the coupling-eyes of the arm and spring, showing their connection with the coupling-bolt. Fig. 8 is a plan view of one of the end portions of the spring. Fig. 9 is a transverse section on line U U, Fig. 2; and Fig. 10 is a top plan view of the spring and its connection with the arm.

A represents the body of the vehicle, to the under side of which are connected the torsion-bars $a$ $a$, which are disposed lengthwise of the body and pass through two shoes $e$ and $b$ firmly attached to the body. The shoe $b$ is located at or near the corner of the body and incloses a cushion $c$ of rubber or other suitable elastic material. The under side of this cushion is preferably formed with a V-shaped recessed seat $c'$ for the torsion-bar $a$, which is of diamond shape in cross-section or otherwise formed with a V-shaped bearing, by which it rests in the seat $c'$. To protect the cushion from undue wear by the pressure of the torsion-bar, I interpose between the torsion-bar and its seat on the cushion $c$ a metal lining $c''$, which is deflected V shape to conform to the seat of the cushion. This metal lining, however, may be dispensed with in some cases when the cushion is composed of good rubber or other proper material and the edge of the torsion-bar is blunt or slightly rounded. The cushion is held in position by flanges $b'$ $b'$, formed on the shoe and extending across the ends of the cushion, and a shield $d$, formed on the shoe and extending across the under side of the cushion and portion of the torsion-bar $a$, resting thereon, serves to exclude to some extent the dirt from the interior of the shoe. The shoe $e$ is formed with a diamond-shaped or other polygonal-shaped channel or seat $e'$, through which the correspondingly-shaped inner end of the torsion-bar $a$ extends, and is thus held from turning on its axis at that point. The outer end of the torsion-bar being free to rock on its seat in the shoe $b$ allows said bar to be twisted and perform the function of a torsion-spring.

In order to retain the torsion-bar $a$ in constant bearing with its seat in the shoe $b$, I form the channel or seat $e'$ of the shoe $e$ inclining toward the bearing of the torsion-bar in the shoe $b$, as illustrated in Fig. 3 of the drawings, said inclination crowding the outer end portion of the torsion-bar upward and toward the cushion $c$. The outer end of the torsion-bar $a$ projects sufficiently beyond the body A to permit of the attachment of the arm C to said end of the bar. This attachment I prefer to make by providing the arm C with a diamond-shaped or other polygonal-shaped eye $C'$, corresponding to the cross-section of the torsion-bar $a$, which is inserted in the said eye. This portion of the torsion-bar I provide with a notch $j$ in one of its edges, as shown in Fig. 6 of the drawings, and in connecting the arm to the torsion-bar I heat the former and insert the latter in a cold condition into the eye $C'$, and then by a pressure or stroke upon the exterior of the arm directly over the notch $j$, I press a portion of the interior of the eye $C'$ into the notch, and in cooling the arm the latter is shrunk onto the torsion-bar, and is thus firmly attached thereto. In this manner I also attach the torsion-bar $a$ to the shoe, as shown in Fig. 3.

D represents the cross-spring which is mounted either on the hind axle or on the head-block. This spring consists of a leaf, on the top of the end portions of which I mount separately-formed eyes $g$, which stand axially at right angles to the spring, and are formed with perforated ears $g'$ $g'$, which are bolted or riveted to the spring.

The end of the arm C which is to be connected to the spring is formed with an eye $f$, which is axially at right angles to the arm, and thus parallel with the eye $g$ of the spring. The interior of the eye $f$ is smaller in diameter than that of the eye $g$, and through said eyes passes the coupling-bolt $h$, which is of correspondingly different diameters to snugly fit said eyes, and is formed with an abrupt shoulder $i$ outside of the eye $g$ adjacent to the eye $f$, so as to bring the end of the latter eye to bear against said shoulder, as illustrated in Fig. 7 of the drawings. The bolt is provided at one end with a head $l$ and at the opposite end with a nut $n$, by which latter the eye $f$ is crowded against the aforesaid shoulder, so as to clamp the bolt to the said eye and prevent its turning therein and allow only the larger portion of the bolt to turn in the eye $g$ of the spring. Inasmuch as it requires very accurate adjustment of the shoes $e$ and $b$, and of the attachment of the arm C to the torsion-bar $a$, so as to bring the eye $f$ to the requisite parallelism with the eye $g$, I make the latter eye adjustable in its position on the spring by providing the latter with a bolt-hole $o$ and a lateral slot $o'$, for the reception of the bolts, by which the eye $g$ is attached to the spring, said slot allowing the eye to be turned, so as to set it perfectly parallel with the eye $f$.

Having described my invention, what I claim as new, and desire to secure by Letters Patent, is—

1. In combination with the body, its supporting-spring, and coupling-arm connected to the spring, the torsion-bar $a$, provided with a V-shaped bearing, a shoe secured to the body, and an elastic cushion interposed between the shoe and V-shaped bearing of the bar $a$, substantially as set forth.

2. In combination with the body, its supporting-spring, and coupling-arm connected to the spring, the torsion-bar $a$, formed with a V-shaped bearing, a shoe secured to the body and receiving through it the said torsion-bar, and an elastic cushion secured in the shoe and formed with a V-shaped seat for the torsion-bar, substantially as described and shown.

3. In combination with the body, its supporting-spring, and coupling-arm connected to said spring, the torsion-bar $a$, formed with a V-shaped bearing, the shoe $b$, secured to the body, the elastic cushion secured to the shoe and formed with a V-shaped seat for the torsion-bar, and a metal lining deflected V shape and interposed between the torsion-bar and aforesaid cushion, substantially as described and shown.

4. In combination with the body and torsion-bar $a$, the shoe $b$, secured to the body and receiving through it the torsion-bar, the cushion $c$, secured to the shoe, and the shield $d$, formed on the shoe and extending across the under side of the torsion-bar and cushion, substantially as described and shown.

In testimony whereof I have hereunto signed my name this 8th day of July, 1889.

EDWARD CLIFF. [L. S.]

Witnesses:
A. A. BLIVEN,
WM. J. GREEN.